(12) United States Patent  (10) Patent No.: US 8,566,343 B2
Baby et al.  (45) Date of Patent: Oct. 22, 2013

(54) SEARCHING BACKWARD TO SPEED UP QUERY

(75) Inventors: Thomas Baby, Maple Valley, WA (US); Sukhendu Chakraborty, San Francisco, CA (US); Junyan Ding, Palo Alto, CA (US); Zhen Hua Liu, San Mateo, CA (US); Anguel Novoselsky, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 12/871,869

(22) Filed: Aug. 30, 2010

(65) Prior Publication Data

US 2011/0302198 A1 Dec. 8, 2011

Related U.S. Application Data

(63) Continuation-in-part of application No. 12/792,659, filed on Jun. 2, 2010.

(51) Int. Cl.
*G06F 17/30* (2006.01)

(52) U.S. Cl.
USPC ............... 707/769; 707/723; 707/749

(58) Field of Classification Search
USPC ......... 707/797, 769, 723, 749, 727, 738, 751, 707/780
See application file for complete search history.

(56) References Cited

U.S. PATENT DOCUMENTS

| | | | |
|---|---|---|---|
| 6,421,656 B1 | 7/2002 | Cheng et al. | |
| 6,535,970 B1 * | 3/2003 | Bills et al. | 711/207 |
| 6,728,823 B1 | 4/2004 | Walker et al. | |
| 6,853,992 B2 | 2/2005 | Igata | |
| 7,162,485 B2 | 1/2007 | Gottlob et al. | |
| 7,281,206 B2 | 10/2007 | Schnelle et al. | |
| 7,366,735 B2 | 4/2008 | Chandrasekar et al. | |
| 7,499,915 B2 | 3/2009 | Chandrasekar et al. | |
| 7,680,764 B2 | 3/2010 | Chandrasekar et al. | |
| 7,734,631 B2 * | 6/2010 | Richardson et al. | 707/749 |
| 7,836,098 B2 | 11/2010 | Baby et al. | |
| 7,870,124 B2 | 1/2011 | Liu et al. | |
| 7,885,980 B2 | 2/2011 | Tarachandani et al. | |
| 7,917,515 B1 | 3/2011 | Lemoine | |

(Continued)

OTHER PUBLICATIONS

U.S. Appl. No. 12/346,393, filed Dec. 30, 2008, Notice of Allowance, Oct. 27, 2011.

(Continued)

*Primary Examiner* — Jean M Corrielus
(74) *Attorney, Agent, or Firm* — Hickman Palermo Truong Becker Bingham Wong LLP

(57) ABSTRACT

A method, computing device, and a non-transitory computer-readable medium are provided for performing a context-aware search by finding a set of nodes that are mapped to a given text or other value and, for each node in the set of nodes, performing a reverse path lookup to determine whether the node satisfies a given context. The query processor performs the reverse path lookup for a node by traversing up a node tree away from the node, using a stored mapping from the node to a parent of the node. Using mappings from nodes to parent nodes, the node tree is traversed backwards from the node up to distant ancestor nodes through parent nodes. An optimizer instructs the query processor to perform a value-based portion of the search before a path-based portion of the search based on value distribution statistics and path distribution statistics.

20 Claims, 7 Drawing Sheets

(56) References Cited

U.S. PATENT DOCUMENTS

| | | |
|---|---|---|
| 8,024,329 B1 | 9/2011 | Rennison |
| 8,090,731 B2 | 1/2012 | Sthanikam et al. |
| 8,244,984 B1 | 8/2012 | Glasco et al. |
| 8,255,394 B2 | 8/2012 | Branigan et al. |
| 8,370,452 B2 | 2/2013 | Harvell et al. |
| 2002/0065822 A1 | 5/2002 | Itani |
| 2002/0116371 A1 | 8/2002 | Doods et al. |
| 2002/0147748 A1 | 10/2002 | Huang et al. |
| 2003/0014397 A1 | 1/2003 | Chau et al. |
| 2003/0035000 A1 | 2/2003 | Licon et al. |
| 2003/0088558 A1 | 5/2003 | Zaharioudakis et al. |
| 2003/0120671 A1 | 6/2003 | Kim et al. |
| 2003/0158854 A1 | 8/2003 | Yoshida et al. |
| 2003/0182268 A1 | 9/2003 | Lal |
| 2004/0060007 A1 | 3/2004 | Gottlob et al. |
| 2004/0210573 A1 | 10/2004 | Abe et al. |
| 2005/0091188 A1 | 4/2005 | Pal et al. |
| 2005/0228818 A1 | 10/2005 | Murthy et al. |
| 2005/0228828 A1 | 10/2005 | Chandrasekar et al. |
| 2005/0229158 A1 | 10/2005 | Thusoo et al. |
| 2005/0289175 A1 | 12/2005 | Krishnaprasad et al. |
| 2006/0047646 A1 | 3/2006 | Maluf et al. |
| 2006/0101320 A1 | 5/2006 | Doods et al. |
| 2006/0106890 A1 | 5/2006 | Paul et al. |
| 2006/0167928 A1 | 7/2006 | Chakraborty et al. |
| 2006/0212420 A1 | 9/2006 | Murthy et al. |
| 2006/0242574 A1* | 10/2006 | Richardson et al. .......... 715/530 |
| 2007/0016604 A1 | 1/2007 | Murthy et al. |
| 2007/0016605 A1 | 1/2007 | Murthy et al. |
| 2007/0174309 A1 | 7/2007 | Pettovello |
| 2007/0198479 A1 | 8/2007 | Cai et al. |
| 2007/0198545 A1 | 8/2007 | Ge et al. |
| 2007/0234199 A1 | 10/2007 | Astigeyevich |
| 2007/0240035 A1 | 10/2007 | Sthanikam et al. |
| 2007/0255748 A1 | 11/2007 | Ferragina et al. |
| 2007/0271243 A1 | 11/2007 | Fan et al. |
| 2007/0299811 A1 | 12/2007 | Chandrasekar et al. |
| 2008/0059417 A1 | 3/2008 | Yamada et al. |
| 2008/0098020 A1 | 4/2008 | Gupta et al. |
| 2008/0114725 A1 | 5/2008 | Indeck et al. |
| 2008/0215527 A1 | 9/2008 | Charlet et al. |
| 2008/0301129 A1 | 12/2008 | Milward et al. |
| 2009/0089263 A1 | 4/2009 | McHugh et al. |
| 2009/0265339 A1 | 10/2009 | Chen et al. |
| 2009/0288026 A1 | 11/2009 | Barabas et al. |
| 2010/0169354 A1 | 7/2010 | Baby |
| 2010/0185683 A1 | 7/2010 | Baby et al. |
| 2010/0228781 A1 | 9/2010 | Fowler |
| 2010/0312771 A1* | 12/2010 | Richardson et al. .......... 707/749 |
| 2010/0332966 A1 | 12/2010 | Idicula et al. |
| 2011/0106811 A1 | 5/2011 | Novoselsky et al. |
| 2011/0179085 A1* | 7/2011 | Hammerschmidt et al. .. 707/797 |
| 2011/0208730 A1* | 8/2011 | Jiang et al. .................... 707/727 |
| 2012/0143919 A1 | 6/2012 | Idicula |

OTHER PUBLICATIONS

U.S. Appl. No. 12/346,327, filed Dec. 30, 2008, Final Office Action, Oct. 20, 2011.

U.S. Appl. No. 12/491,981, filed Jun. 25, 2009, Restriction Requirement, Dec. 8, 2011.

U.S. Appl. No. 12/792,659, filed Jun. 2, 2010, Office Action, Feb. 6, 2012.

U.S. Appl. No. 12/491,981, filed Jun. 25, 2009, Office Action, Apr. 11, 2012.

U.S. Appl. No. 12/346,327, filed Dec. 30, 2008, Office Action, May 5, 2011.

U.S. Appl. No. 12/690,820, filed Jan. 20, 2010, Notice of Allowance, Jul. 9, 2012.

U.S. Appl. No. 12/610,047, filed Oct. 30, 2009, Office Action, Oct. 20, 2011.

U.S. Appl. No. 12/610,047, filed Oct. 30, 2009, Notice of Allowance, May 4, 2012.

U.S. Appl. No. 12/792,659, filed Jun. 2, 2010, Office Action, May 16, 2012.

Google Scholar, "Xml Index and Nodes Indexes", dated 2011, 2 pages.

U.S. Appl. No. 12/631,985, filed Dec. 7, 2009.

* cited by examiner

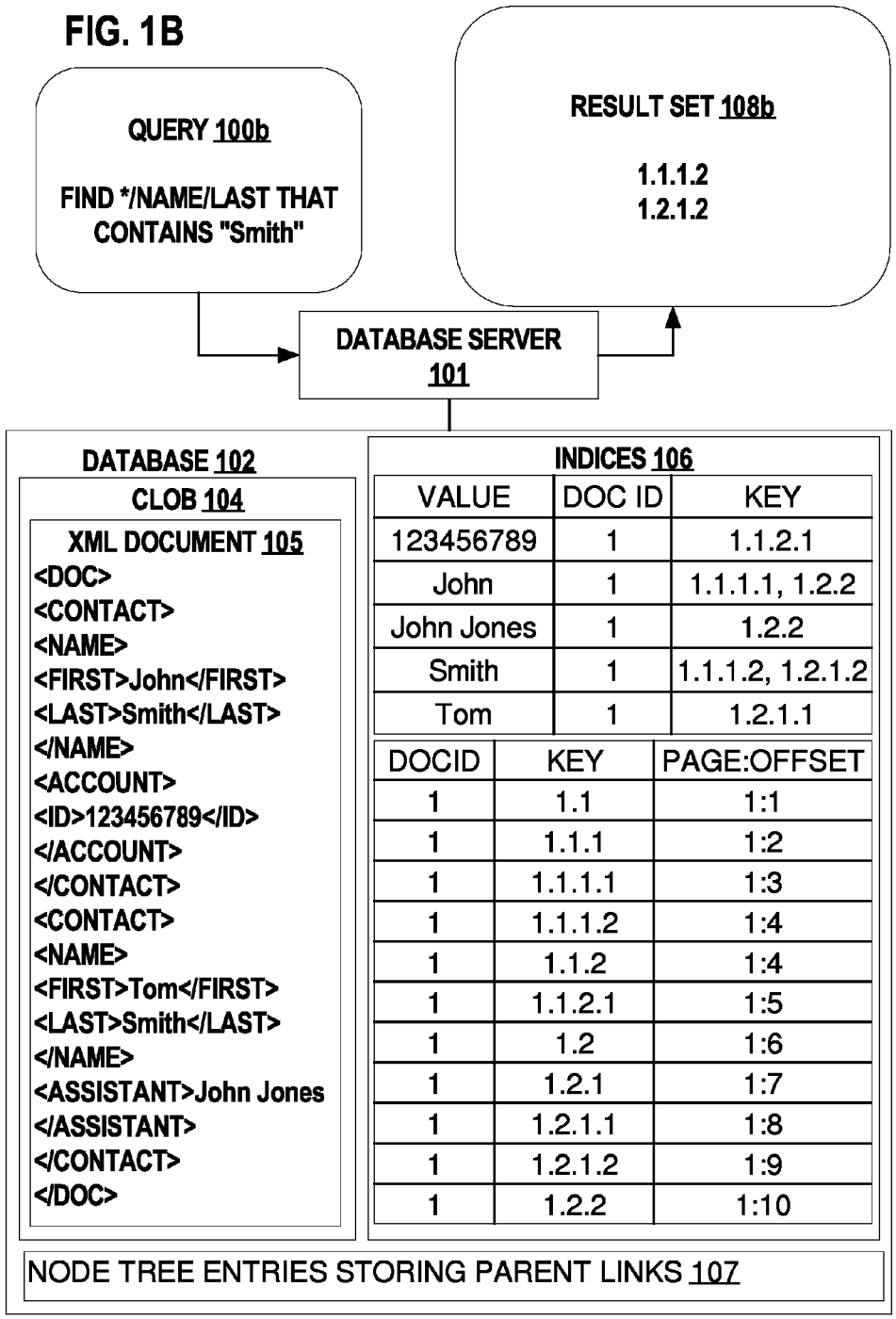

```
<a name="bcd">
    <b>
        "efg"
    </b>

<c>

<d>
            "hij"
        </d>
    </c>
</a>
```

FIG. 4A

SEARCHING BACKWARD TO SPEED UP QUERY

CROSS-REFERENCE TO RELATED APPLICATIONS; BENEFIT CLAIM

This application claims benefit as a continuation-in-part of application Ser. No. 12/792,659, entitled Providing Context Aware Search Adaptively, filed Jun. 2, 2010, the entire contents of which is hereby incorporated by reference as if fully set forth herein, under 35 U.S.C. §120. The applicant hereby rescinds any disclaimer of claim scope in the parent application or the prosecution history thereof and advises the USPTO that the claims in this application may be broader or otherwise of a different scope than any claim in the parent application.

The present application is also related to: (1) U.S. patent application Ser. No. 12/610,047, entitled Efficient XML Tree Indexing Structure Over XML Content, filed on Oct. 30, 2009, the entire contents of which are incorporated herein by reference; (2) U.S. patent application Ser. No. 12/491,981, entitled A Technique For Skipping Irrelevant Portions Of Documents During Streaming XPath Evaluation, filed on Jun. 25, 2009, the entire contents of which are incorporated herein by reference; (3) U.S. patent application Ser. No. 12/346,393, entitled An Indexing Strategy With Improved DML Performance And Space Usage For Node-Aware Full-Text Search Over XML, filed on Dec. 30, 2008, the entire contents of which are incorporated herein by reference; (4) U.S. patent application Ser. No. 12/346,327, entitled An Indexing Mechanism For Efficient Node-Aware Full-Text Search Over XML, filed on Dec. 30, 2008, the entire contents of which are incorporated herein by reference; (5) U.S. Pat. No. 7,499,915, entitled Index For Accessing XML Data, filed on Jul. 2, 2004, the entire contents of which are incorporated herein by reference; (6) U.S. Pat. No. 7,024,425, entitled Method And Apparatus For Flexible Storage And Uniform Manipulation of XML Data In A Relational Database System, filed on Sep. 6, 2001, the entire contents of which are incorporated herein by reference; and (7) U.S. Pat. No. 6,871,204, entitled Apparatus And Method For Mapping Relational Data And Metadata To XML, filed on Sep. 6, 2001, the entire contents of which are incorporated herein by reference. The applicant hereby rescinds any disclaimer of claim scope in the related applications or the prosecution history thereof and advises the USPTO that the claims in this application may be broader or otherwise of a different scope than any claim in the related applications.

FIELD OF THE INVENTION

The present invention relates to performing a context-aware search for nodes within structured documents.

BACKGROUND

Marked Up Data

Applications often store data as text documents with contextual clues provided within the text. A "context" may be provided for a data value by tagging or labeling the data value within the text. The context for a data value may be provided by a single label or a combination of labels, such as a hierarchical path of labels. In one example, a value of "Tom" may be prefaced with a label of "Name". Various markup signals may be used to distinguish between the data values and the labels themselves. For example, a label may be marked with a "//", such as in "//Name Tom," or a "-", such as in "-Name Tom". In many markup languages, the label is provided within angle brackets, such as in "<Name>Tom." The end of the data value may also be marked. For example, the end may be marked with "</Name>." The end may also be marked by the beginning of another label, for example "-Name Tom-Age 25". The marked up data may indicate a hierarchical structure such that a single data value falls under a path of labels, such as in "<CONTACT><NAME>Tom</NAME></CONTACT>," where "Tom" falls under the path of "CONTACT/NAME." Alternately, data values may be marked with individual labels that do not specify a hierarchical path, such as in "-Name Tom-Age 25." Extensible Markup Language (XML) is an example markup language that is used to provide context for data.

XML

Extensible Markup Language (XML) is a World Wide Web Consortium (W3C) standard for representing data. Many applications are designed to output data in the form of XML documents. Various techniques may be used to store data from such XML documents into a relational database. XML serves as an exemplary markup language that may be used with the techniques described herein.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant elements. Collectively, an element along with its attributes and descendants, are referred to as a tree or a sub-tree.

XML Query and XPath

XML Query Language (XQuery) and XML Path Language (XPath) are important standards for a query language, which can be used in conjunction with SQL to express a large variety of useful queries to search within XML data. XPath is described in XML Path Language (XPath), version 1.0 (W3C Recommendation 16 Nov. 1999), herein incorporated by reference and available at the time of writing at http://www.w3.org/TR/xpath, as well as in XML Path Language (XPath) 2.0 (W3C Recommendation 23 Jan. 2007), herein incorporated by reference and available at the time of writing at http://www.w3.org/TR/xpath. XQuery is described in XQuery 1.0: An XML Query Language (W3C Recommendation 23 Jan. 2007), herein incorporated by reference and available at the time of writing at http://www.w3.org/TR/xquery.

Path Expressions

The structure of an XML document establishes parent-child relationships between the nodes within the XML document. The "path" for a node in an XML document reflects the series of parent-child links, starting from a "root" node, to arrive at the particular node. For example, the path to the ID node in the example XML document 105 shown in FIG. 1A is /CONTACT/ACCOUNT/ID, since the "ID" node is a child of the "ACCOUNT" node, and the "ACCOUNT" node is a child of the "CONTACT" node.

XPath expressions are used to specify a location in an XML construct, e.g., a "node" of a node tree, such as a DOM tree, for the XML construct, in a series of steps from a root level of the DOM indicated by a leading slash "/". A step to a child element from a parent element is indicated by a slash "/," and an attribute of an element is indicated by an ampersand "@". Each direction of traversal from an element is called an axis of traversal. In addition to child and attribute axes, there are axes that represent traversals to a parent, all descendents, all ancestors, all siblings, all preceding elements, all following elements, only elements of a particular type, as well as other axes. Wildcard placeholders, such as '*', may be used to indicate that a portion of a path can be satisfied by any single element or any combination of elements.

Approaches to Context-Aware Search

A context-aware search may be performed by traversing the nodes of each document from the root node down to find all nodes in a set of documents that are under a given path and satisfy a given text or other value. For example, for the XPath '/A/B/C=3', each document is searched for all A nodes under the root node, then for all B nodes under the A nodes, and then for all child C nodes in which the text value is 3. The process of scanning through documents can be expensive in terms of processing power, memory usage, and time consumption, especially when there are several matching nodes at each XPath step.

A path index and a text index or other value index may be used to expedite context-aware search. Using the path index, the path portion of the query may be efficiently evaluated to determine a set of all nodes that satisfy the path portion of the expression. Using the text index or other value index, the text or other value portion of the query may be efficiently evaluated to determine a set of all nodes that satisfy the text or other value portion of the expression. Results for the query are then computed by joining or intersecting the results obtained using the path index with the results obtained using the text index or other value index. Notwithstanding the benefits of using XML indices, maintaining both the path index and the text index or the other value index may be infeasible when existing XML documents are frequently updated and new XML documents are frequently added.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which:

FIG. 1A and FIG. 1B are diagrams illustrating an example database server for evaluating queries by mapping text or other values to nodes within an XML document and then performing a reverse path lookup on the nodes.

FIG. 4A is an example XML document.

DETAILED DESCRIPTION

Figure 1A:
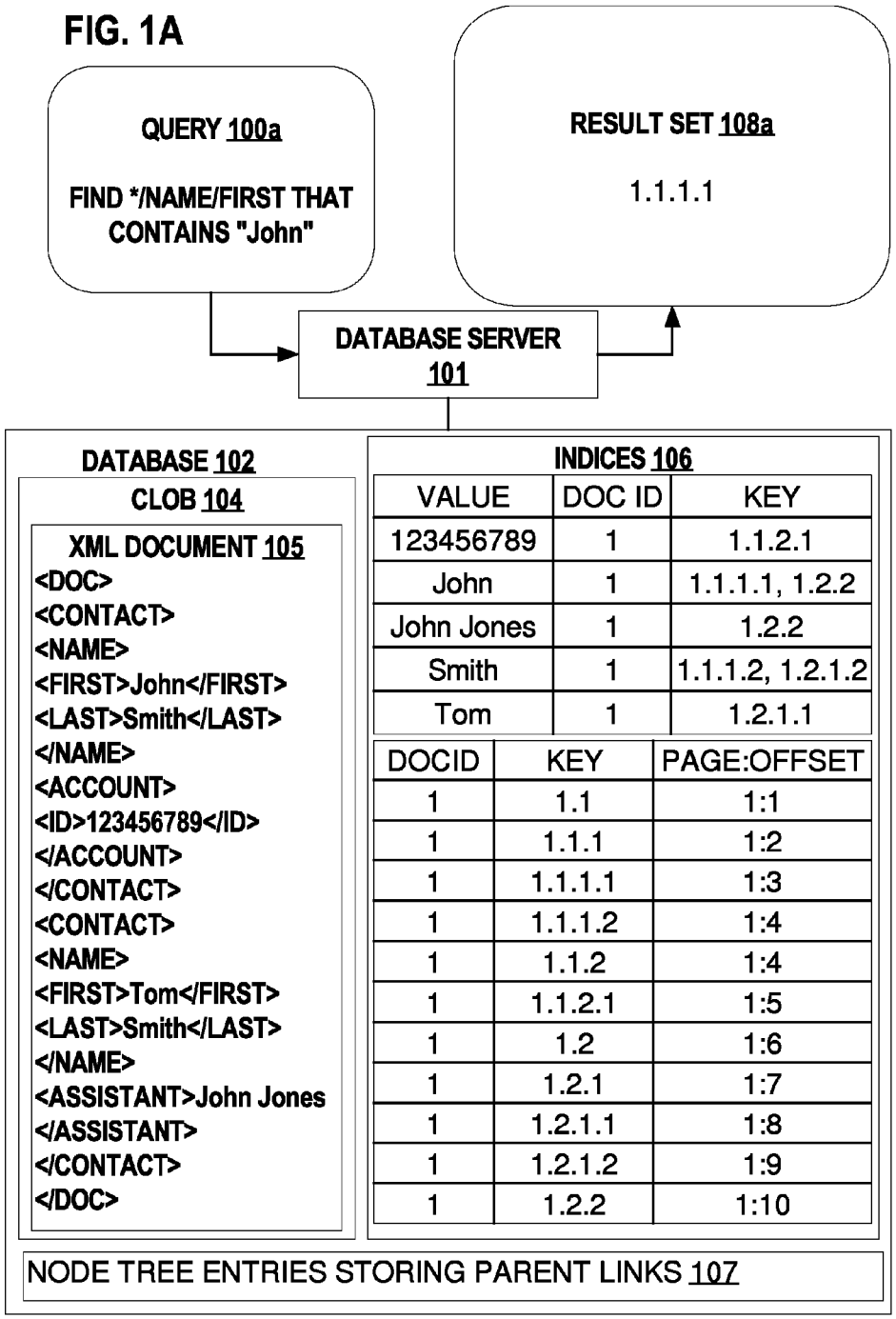
Figure 2:
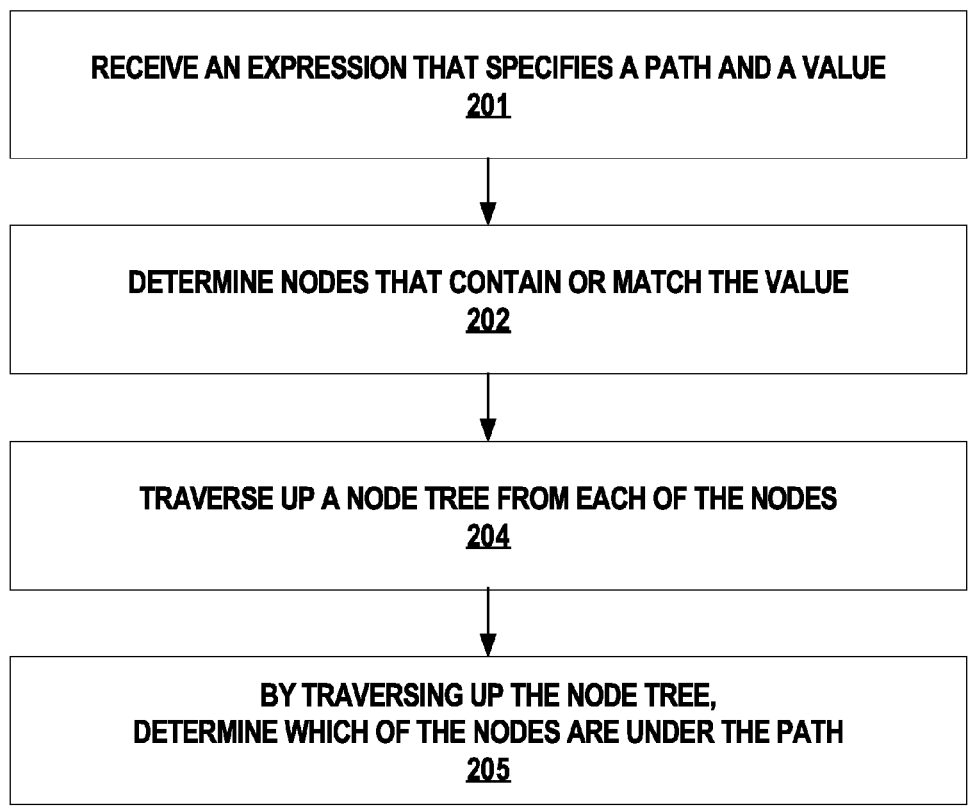
FIG. 2 is a diagram illustrating example steps for performing a context-aware search.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, computing device, and a non-transitory computer-readable storage medium are described for performing a context-aware search by finding a set of nodes that contain, match, or are otherwise mapped to a specified text or other value. Then, for each node in the set of nodes, a context portion of the search is evaluated by traversing backwards up a node tree, away from the node, to determine whether the node satisfies a specified context. In one embodiment, a query processor utilizes a text index or other value index to efficiently reduce the number of nodes down to a set of nodes that contain or match the specified text or other value. Then, the query processor performs a reverse path lookup on a node using a node tree index or a Document Object Model tree to determine whether the node satisfies the specified context. For example, the query processor uses a stored mapping from the node to its parent, and, optionally, from the parent to the grandparent, etc., to determine whether the node satisfies the specified context by being under a specified path.

In one embodiment, an optimizer uses text or other value distribution statistics and/or path distribution statistics to determine whether or not to perform a value-based portion of the search before a path-based portion of the search. The statistics may be used to determine that the text-based or other value-based portion of the search would be more selective than the path-based portion of the search. In response to determining that the text-based or other value-based portion would be more selective, the query processor finds nodes that match the specified value or contain the specified text and then performs a reverse path lookup on the nodes to determine whether the nodes satisfy a specified context.

Mapping Values to Nodes

To support an efficient context-aware search of the documents, keywords, strings, or other values may be mapped to nodes within documents that contain the keywords, strings, or other values. The mappings may be provided in a single index or in multiple indices. In one example, a first index stores keyword to document mappings, and a second index stores keyword to node mappings. In this manner, the database server may efficiently evaluate a query to determine the documents and nodes within the documents that contain a given value.

In one embodiment, the documents are identified by document identifiers, and the nodes are identified by a hierarchical order key (for example, 1, 1.1, 1.1.1, 1.1.2, 1.2, 1.2.1, etc.) within the document. The hierarchical order key identifies a hierarchical path to the node within the nodes of the document. In another embodiment, the nodes in the document are marked in a manner that provides context in the form of a label even though the labels are not organized hierarchically. The labels may be identified by keys (for example, 1, 2, 3, etc.) associated with the labels that appear within the document.

Hierarchical order key examples are provided in U.S. Pat. No. 7,499,915, entitled Index For Accessing XML Data, which has been incorporated by reference herein. According to one embodiment, the hierarchical information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the "4" indicates that node C is the fourth child of node B. The "2" indicates that Node B is the second child of node A. The leading "1" indicates that node A is the root node (i.e. has no parent).

A mapping of text or other values to nodes within documents may be stored in an index in order to facilitate an efficient search. FIG. 1A illustrates example indices 106 that are provided for an XML document 105. As shown, values from XML document 105 are mapped to document identifiers and keys. The illustrated example involves nodes of a single XML document, but the indices could map any number of values to any number of nodes in any number of documents.

Document Object Model

Industry standards define structures for representing XML trees. One such standard is the Document Object Model (DOM), promulgated by the World Wide Web Consortium (W3C). An XML tree that conforms to the DOM standard is referred to herein as a DOM tree.

In order for a computer to operate on an XML tree, an in-memory representation of the XML tree is generated. In general, an XML tree is constructed from an XML document by creating in-memory data structures that represent nodes of the XML document. The in-memory data structures are manipulated by applications running on the computer. Typically, the applications access and manipulate the data structures through a set of routines or functions designed for this purpose.

Typically, a DOM tree is represented as a node tree, which is a set of linked nodes that are hierarchically related. A node in the node tree represents, for example, an element or an attribute. Links between a node and another node represent a hierarchal tree relationship between the nodes and their corresponding elements. For example, a node corresponding to a child element may be linked to a node representing a parent of the child element.

The DOM tree is navigated using an XPath expression that indicates a particular node of content in the hierarchy of elements and attributes in an XML document. For example, given node 'C' with at a path of '/A/B/C', the DOM tree may be navigated from 'C' to the parent of 'C' using the XPath expression 'C/ . . . '. The DOM tree for an XML document may be traversed backwards from a leaf node to a parent of the leaf node, from the parent to its parent, and so on, up to the root node of the XML document. A path of descendant nodes may be discovered for a given node by traversing up the tree away from the given node, from the given node to its parent, from its parent to its grandparent, etc.

Node Tree Index

In U.S. patent application Ser. No. 12/610,047, entitled Efficient XML Tree Indexing Structure Over XML Content, which has been incorporated by reference herein, techniques are provided for building and using a persistent XML tree index to navigate the nodes of an XML document, whether the XML document is stored in a database, in a persistent file system, or as a sequence in memory. In one embodiment, the XML tree index is stored separately from the XML document as fixed-sized index entries. The XML document hierarchy need not be constructed in volatile memory, so creating and using the XML tree index scales even for large documents. To evaluate a path expression including descendant or ancestral syntax, navigation links can be read from persistent storage and used directly to find the elements specified in the path expression. The use of an abstract navigation interface allows applications to be written that are independent of the storage implementation of the index and the content.

For example, a persistent XML tree index may be created that allows direct navigation to the root of the hierarchy, a parent, ancestor, sibling, or child. There is no need to construct a DOM tree in memory before traversing links to perform a navigation operation because the index hierarchy may be saved persistently in non-volatile storage.

Each XML document may have its own separate XML tree index. An index may be generated and stored in response to a request to index a particular XML document. One index entry corresponds to one node of the corresponding XML document. There are both navigation links and links to content stored in each index entry. Navigation links point to other index entries for traversing the XML hierarchy, and content links point into the XML content storage. In one embodiment, an index entry for a node includes a content link that provides a physical location of the node within the XML document.

Figure 3:
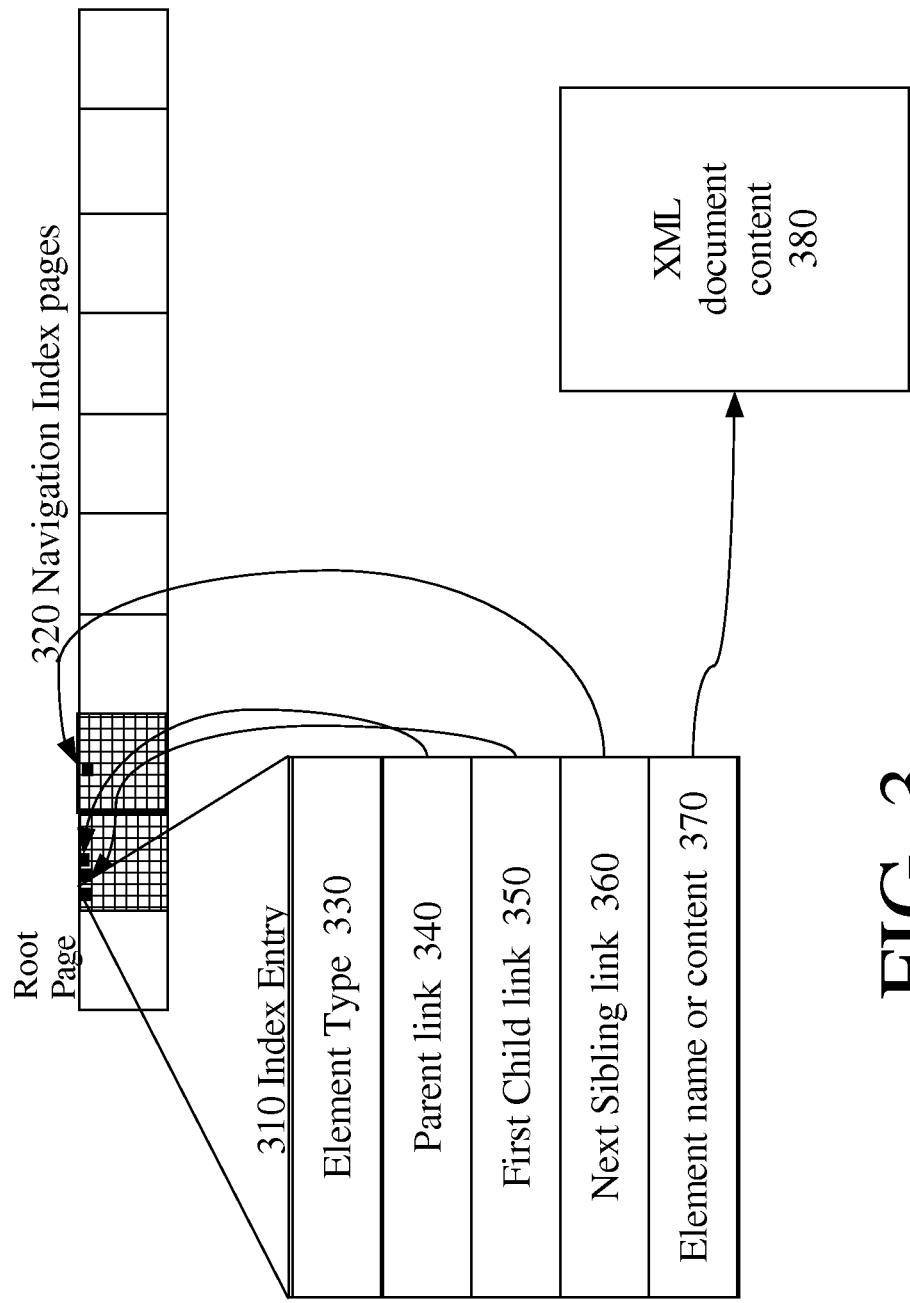
FIG. 3 is a diagram illustrating an example XML tree index entry for a node that stores a link to the node's parent.

Referring to FIG. 3, each page of the Navigation Index 320 is divided into a set of fixed-sized index entries. An Index Entry 310 is comprised of the following information: element type, parent link, first child link, next sibling link, and a link into the XML content that either contains the element name or the element value if the element is a leaf node. Element Type 330 indicates the type of node that corresponds to the index entry and may be, for example, an element, attribute, text, comment, or processing instruction code.

The arrows from the Parent Link 340, First Child Link 350, and Next Sibling Link 360 all point to other index entries within the XML tree index. The other index entries may reside in the same page or a different page as the index entry containing the links. For example, the Parent Link 340 entry points to an entry for the parent of the node. In one embodiment, the entry for the parent node also contains a Parent Link entry that points to its parent. In this manner, the node tree index may be traversed backwards from a given leaf node up to distant ancestor nodes through parent nodes. In other words, a suffix or ending of the path up to an entire path of a given node may be discovered in steps by linking to parent nodes, starting with the given node.

The embodiment shown in FIG. 3 is a set of links for supporting DOM navigation. Additional links may be used for further performance enhancements including but not limited to having separate child element and attribute links, and a previous sibling link. That is, instead of linking elements and attributes together as siblings, there can be a list of attributes and a list of children elements, and a pointer to each list may be stored in the index entry. In addition, an index entry may include a flag to indicate that the index entry corresponds to a first child node or a last child node.

The size of each index entry may be selected to optimize the performance of accessing the data contained within each index entry. In one embodiment, the size of an index entry is selected so that each entry lies on an address boundary that is a power of two. Fast array arithmetic, for example using bit shifting operator instead of multiplication, may be used for determining the location of a desired index entry. The location of an index entry may be expressed as a (page number, offset number) pair, where the offset number may also be referred to as the index entry number.

Figure 4A:
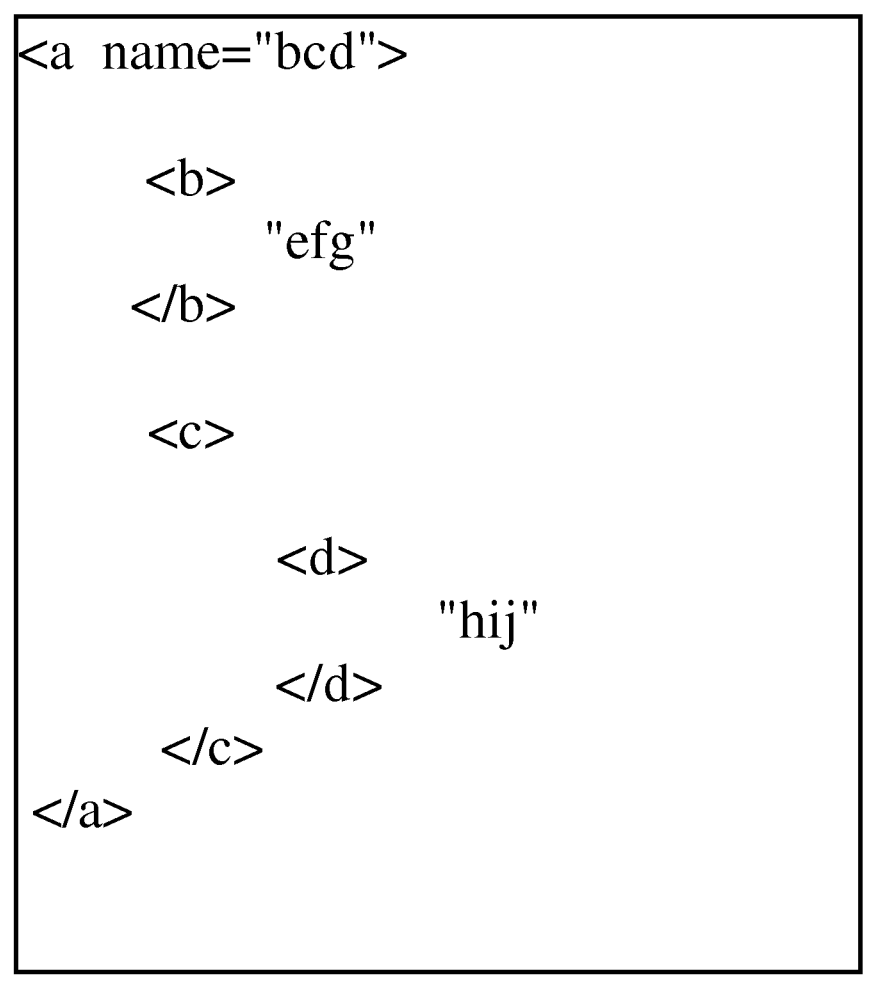
Figure 4B:
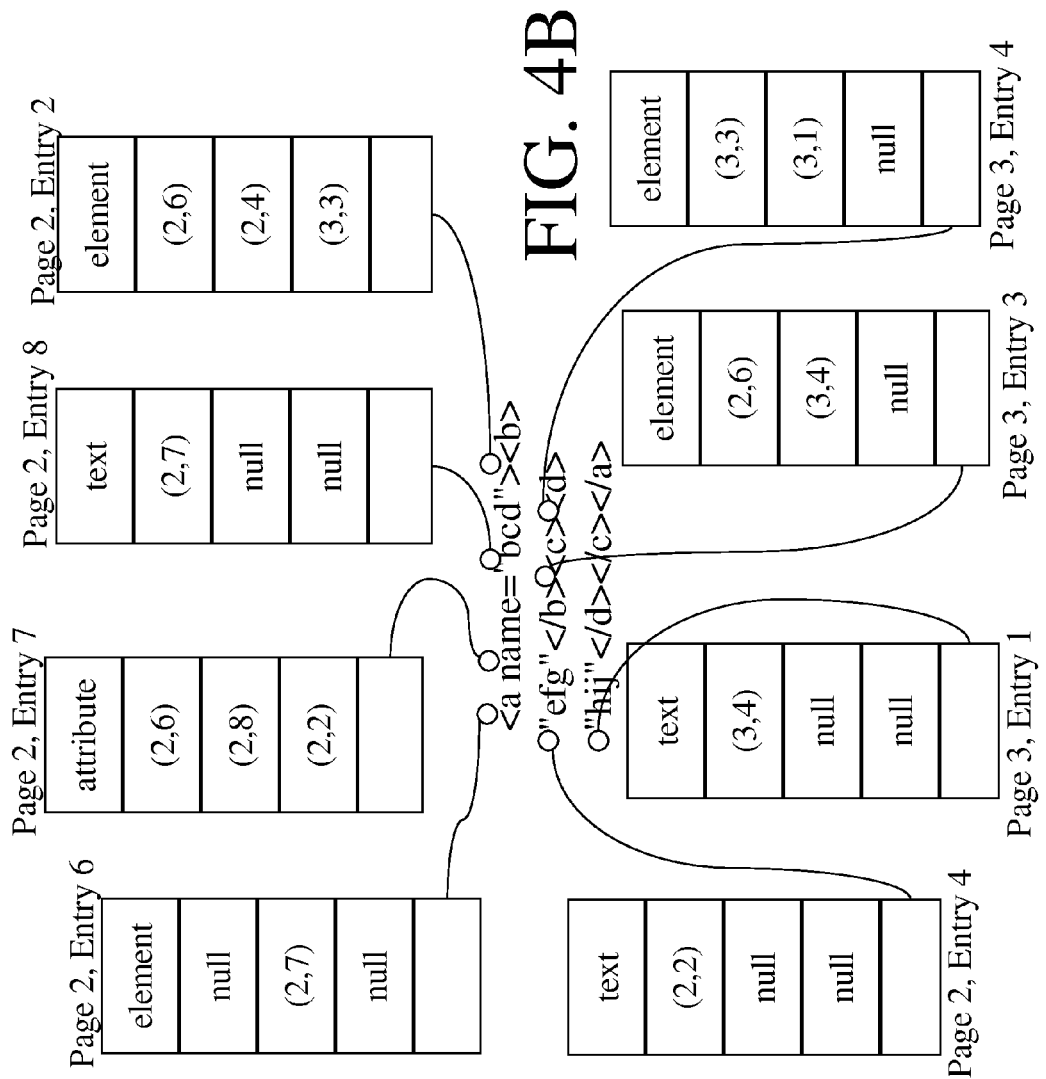
FIG. 4B is a diagram of example index entries for the example document in FIG. 4A.

FIG. 4A shows a simple XML document that is used in FIG. 4B to provide an example set of index entries representing an XML tree index on the example XML document shown in FIG. 4A. Each index entry is labeled with the page number and index entry number. The index entry number may be an offset of the entry from the beginning of the page. The links may be indicated by a (page number, entry number) pair. Thus (1,1) may be a link that references the first entry of the first page of the XML tree index. In the example, the index entry corresponding to XML element "a" resides at (Page 2, Entry 6). Element "a" is the root entry of the document. As such, there are no parent or sibling links. In an embodiment where child and attribute links are treated as siblings (i.e., there is only one link to both children and attributes), the first child link corresponds to (Page 2, Entry 7) which represents the attribute "name." In an embodiment where there are separate links for first child and first attribute, the first attribute link corresponds to (Page 2, Entry 7). The content link for the root of the document points to a location within the content where the element name "a" is stored.

The index entry for the attribute "name" has a parent link back to the entry representing element "a". The index entry points to a child entry represented by (Page 2, Entry 8). The sibling link points to the entry representing element "b" located at (Page 2, Entry 2), because element 2 is the next child of element "a" that follows the attribute "name." The content link for the attribute points to a location in the content where the attribute name "name" is stored.

(Page 2, Entry 8) represents an XML leaf node containing the content of the attribute. The content link points to a location in the content where the value "bcd" is stored. The attribute value has a parent link to the attribute name but contains no child or sibling links.

There are many possible embodiments for how the content links are represented. In one embodiment, where the XML is a sequence of bytes, the content link may be a byte offset from the beginning of the document. In another embodiment, the strings may be parsed out of the XML document and placed in a table, with the content link referencing the symbol table entry corresponding to the string content. Different embodiments may be storage dependent. For example, if XML content is stored as binary XML, the link to the content may be a token identifier that can be used to retrieve the content from the token table.

In the embodiment shown in FIG. 1A, indices 106 map document identifier and key pairs to a node tree entry 107 that stores a pointer to an entry for the parent of the node. In turn, the entry for the parent of the node points to an entry for its parent. In one embodiment, each node is linked to its parent such that a path of ancestor nodes may be discovered for a given node by traversing up the tree away from the given node, from the given node to its parent, from its parent to its grandparent, etc. An example node tree entry is shown in FIG. 3, where item 340 of index entry stores a reference to the parent node or to an entry for the parent node.

Reverse Path Lookup

After the query processor has found a node that contains, matches, or is otherwise mapped to a specified text or other value, optionally using a value index, the query processor may traverse backwards up a node tree, away from the node, to determine whether the node satisfies a specified context. In one embodiment, the collection of XML documents is narrowed down to a set of nodes that satisfy a value portion of a query as a result of making a value-based determination. The query processor then performs backwards traversal up a node tree for each node in the set of nodes to determine whether each node in the set satisfies the context portion of the query. For example, the query processor uses a stored mapping from the node to its parent, and, optionally, from the parent to the grandparent, etc., to determine whether the node is under a path that is specified in the query. This reverse path lookup may be performed using a node tree even if there is no path index to lookup the path. The techniques provided herein are not limited to any particular manner for traversing backwards up a node tree away from a value-matching or value-containing node.

In one embodiment, the stored mapping from the node to its parent is provided in a DOM tree that includes the node. For example, after narrowing down a collection of XML documents with a plurality of nodes to a set of nodes that satisfy a value portion of a query, the query processor locates each of the set of nodes in DOM trees for the corresponding XML documents. In one embodiment, each node is analyzed serially such that only one DOM tree is ready into memory at a time. In another embodiment, multiple DOM trees are ready into memory in parallel, each DOM tree including at least one node that satisfies the value-based determination. In one example, a number of DOM trees read into memory is based on an amount of memory currently available in a system processing the query. One or more path-based determinations are made for each of the DOM trees read into memory. Then, the DOM trees in memory may be replaced by other DOM trees that include other nodes that satisfy the value-based determination.

The query processor may utilize DOM trees to make path-determinations by traversing up DOM trees backwards starting with the nodes that satisfy the value-based determination. For example, a node that contained text or some other value is located within a DOM tree. The DOM tree is used to locate a parent of that node, the parent's parent, etc., until a path-based determination can be made.

In the example in FIG. 1A, a query 100a for "*/NAME/FIRST contains 'John'" is performed on a collection of documents that includes XML Document 105. Indices 106 are used to map "John" to two nodes: a node with an order key 1.1.1.1 and a node with an order key of 1.2.2. The DOM tree is read into memory for the node with an order key of 1.1.1.1. Using the DOM tree, a query processor such as database server 101 determines that the node is a text node that is a child of the "FIRST" node. Based on a mapping from the "FIRST" node to its parent, the query processor traverses backwards up the node tree to determine that the "FIRST" node is a child of the "NAME" node. With or without looking at any other nodes, the query processor may add the node with the order key of 1.1.1.1 to result set 108a of nodes that contain "John" under a path of "*/NAME/FIRST".

Either in serial or in parallel, the DOM tree for the node with an order key of 1.2.2 is read into memory. Using the DOM tree, the query processor determines that the node is a text node that is a child of the "ASSISTANT" node. Traversing backwards up the node tree, the query processor determines that the "ASSISTANT" node is a child of the "CONTACT" node. Further steps of backwards traversal reveal that the "CONTACT" node is a child of the "DOC" node, which is a child of the root node. Because this second instance of the value "John" is under the path "/DOC/CONTACT/ASSISTANT/", and not "*/NAME/FIRST", the query processor excludes the second instance of the value "John" from result set 108*a*.

As illustrated in this single document example, result set 108*a* returned by database server 101 lists the order key of the node that satisfies the query. In other examples, database server 101 returns in the result set document identifiers, node values, node paths, node keys, a binary true or false value, and/or any other information that is based at least in part on determining that a node satisfies the query.

In one embodiment, the stored mapping from the node to its parent is provided in a node tree index that includes an entry for the node. For example, after narrowing down a collection of XML documents with a plurality of nodes to a set of nodes that satisfy a value portion of a query, the query processor locates entries 107 for each of the set of nodes in node tree indices for the corresponding XML documents. In one embodiment, entries 107 are located based on: (1) a value index of indices 106 that maps a value to a document ID and an order key, and (2) a secondary index of indices 106 that maps the document ID and order key to a page and offset that describes a location of the node tree entry 107 of the node tree index.

The query processor may utilize the node tree index entries 107 to make path-determinations by traversing up the node tree index backwards starting with entries 107 for nodes that satisfy the value-based determination. For example, an entry 107 for a node that contained text or some other value is located within the node tree index. The located node tree entry 107 includes a Parent link 340 to an entry for a parent of that node. In turn, the entry for the parent includes a link to an entry for its parent, the original node's grandparent. The node tree entries continue to be traversed in a backwards manner until a path-based determination can be made.

In the example from FIG. 1A, a path-based determination is made for a path portion of a search, "*/NAME/FIRST contains 'John'", by traversing up node tree index entries. A query processor such as database server 101 determines that two node tree entries 107 satisfy a value-based portion of the query. Based on the node tree index entries 107, the query processor determines that the node is a text node that is a child of the "FIRST" node. The node tree index entry for the "FIRST" node includes a Parent link 340 to an entry for its parent, the "NAME" node. With or without looking at any other nodes, the query processor may add the node under "NAME/FIRST" to result set 108*a* of nodes that contain "John" under a path of "*/NAME/FIRST".

The query processor also determines that the node with an order key of 1.2.2 is mapped to a text node that is a child of the "ASSISTANT" node. Traversing backwards up the node tree index entries, the query processor determines that the "ASSISTANT" node is a child of the "CONTACT" node. Further steps of backwards traversal use the Parent links 340 in the respective node tree index entries to discover that the "CONTACT" node is a child of the "DOC" node, which is a child of the root node. Because this second instance of the value "John" is under the path "/DOC/CONTACT/ASSISTANT/", and not "*/NAME/FIRST", the query processor excludes the second instance of the value "John" from result set 108*a*.

In another example from FIG. 1B, database server 101 makes a value-based determination for a query, "*/NAME/LAST contains 'Smith'". The value-based determination identifies two nodes that contain "Smith": 1.1.1.2 and 1.2.1.2. By locating the nodes in the node tree, the query processor determines that both the first node and the second node are text nodes that are children of a "LAST" node. The query processor traverses backwards up the node tree from the "LAST nodes to determine that both instances of the "LAST" node are children of a "NAME" node. With or without looking at any other nodes, the query processor may add the first node and the second node under "NAME/LAST" to result set 108*b* of nodes that contain "Smith" under a path of "*/NAME/LAST".

In one embodiment, the process of making path-based determinations continue until a path-based determination has been made for each node that satisfied the value-based determination. In this case, the result set includes all nodes in the collection of XML documents that satisfy the query. In another embodiment, the process of making path-based determinations stops once the query processor finds at least one or at least some other specified number of nodes that satisfy both the value-based determination and the path-based determination. In this latter case, the result set includes at least one or at least some other specified number of nodes that satisfy the query.

Switching Between Forward and Reverse Path Lookup

A database system using the techniques described herein may choose whether or not to evaluate context-aware searches by making value-based determinations before performing a reverse path lookup. In one embodiment, an optimizer uses text or other value distribution statistics and/or path distribution statistics to determine whether or not to perform a value-based portion of the search before a path-based portion of the search. The statistics may be used to determine that the text-based or other value-based portion of the search would be more selective than the path-based portion of the search. In response to the optimizer determining that the text-based or other value-based portion would be more selective, the optimizer instructs the query processor to perform a forward lookup or a reverse path lookup. In one example, the optimizer instructs the query processor by providing a hint to the query processor. In another example, the optimizer instructs the query processor by rewriting the query so that the value-based determination is performed before a reverse path lookup.

In one embodiment, the value distribution statistics include a histogram distribution of values in the collection of XML documents stored in the database. Certain strings of text may appear much more frequently in the documents than other strings of text. For example, the string "California" may appear more frequently than the string "Redwood City." If the value appears above a threshold frequency, or in greater than a threshold percentage of nodes or documents, then the optimizer may elect to perform the path-based portion of the search before or in parallel with the value-based portion of the search. Similarly, if the value appears below the threshold frequency, or in fewer than the threshold percentage of nodes or documents, then the optimizer may elect to perform the value-based portion of the search followed by a reverse path lookup.

In one embodiment, the path distribution statistics include a histogram distribution of unique paths in the collection of XML documents stored in the database. Certain paths may appear much less frequently in the documents than other paths. For example, the path "/Author/Z" may appear less frequently than the path "/Author/S." If the value appears below a threshold frequency, or in fewer than a threshold percentage of nodes or documents, then the optimizer may elect to perform the path-based portion of the search before or in parallel with the value-based portion of the search. Similarly, if the value appears above a threshold frequency, or in greater than a threshold percentage of nodes or documents, then the optimizer may elect to perform the value-based portion of the search followed by a reverse path lookup.

In one embodiment, the statistics are used to calculate a predicted selectivity value for the value-based determination and the path-based determination. If the value-based determination is predicted to be more selective than the path-based determination, then the optimizer may elect to perform the value-based portion of the search followed by a reverse path lookup. Similarly, if the path-based determination is predicted to be more selective than the value-based determination, then the optimizer may elect to perform the path-based portion of the search before or in parallel with the value-based portion of the search.

In one embodiment, the value distribution statistics and path distribution statistics are computed based on a dynamic sampling performed at compile time. For example, statistics gathered from a random subset of nodes, from a random subset of documents, or from some other random subset of the data may be used as the value distribution statistics and/or the path distribution statistics for all queries. In another embodiment, value distribution statistics and path distribution statistics are gathered from other sources and are not based on the collection of XML documents. For example, a word distribution list for a particular language, such as English, may be used for documents that contain text written in that language.

In one embodiment, the optimizer determines whether or not to use reverse path lookup based at least in part on an expected height of node trees for documents that are likely to contain nodes that satisfy the value-based portion of the query. For example, a first set of documents may have an average node tree height of 5, and a second set of documents may have an average node tree height of 50. The optimizer is less likely to suggest a reverse path lookup if the value is more likely to occur in the second set of documents than in the first set of documents.

Updating Indices

In one embodiment, the node tree index is automatically updated when the content of the XML documents changes to affect the physical location of the content within the document. For example, when a node is inserted into the hierarchy or the size of an element name or text value is changed, the physical locations and links for affected nodes must be updated to reflect the change. Thus, only the affected node tree index entries are changed. In one embodiment, the node tree entries are not updated when a value stored in a text node changes. In one embodiment, the value-to-node mapping is updated whenever the XML document is changed to add or remove a value.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
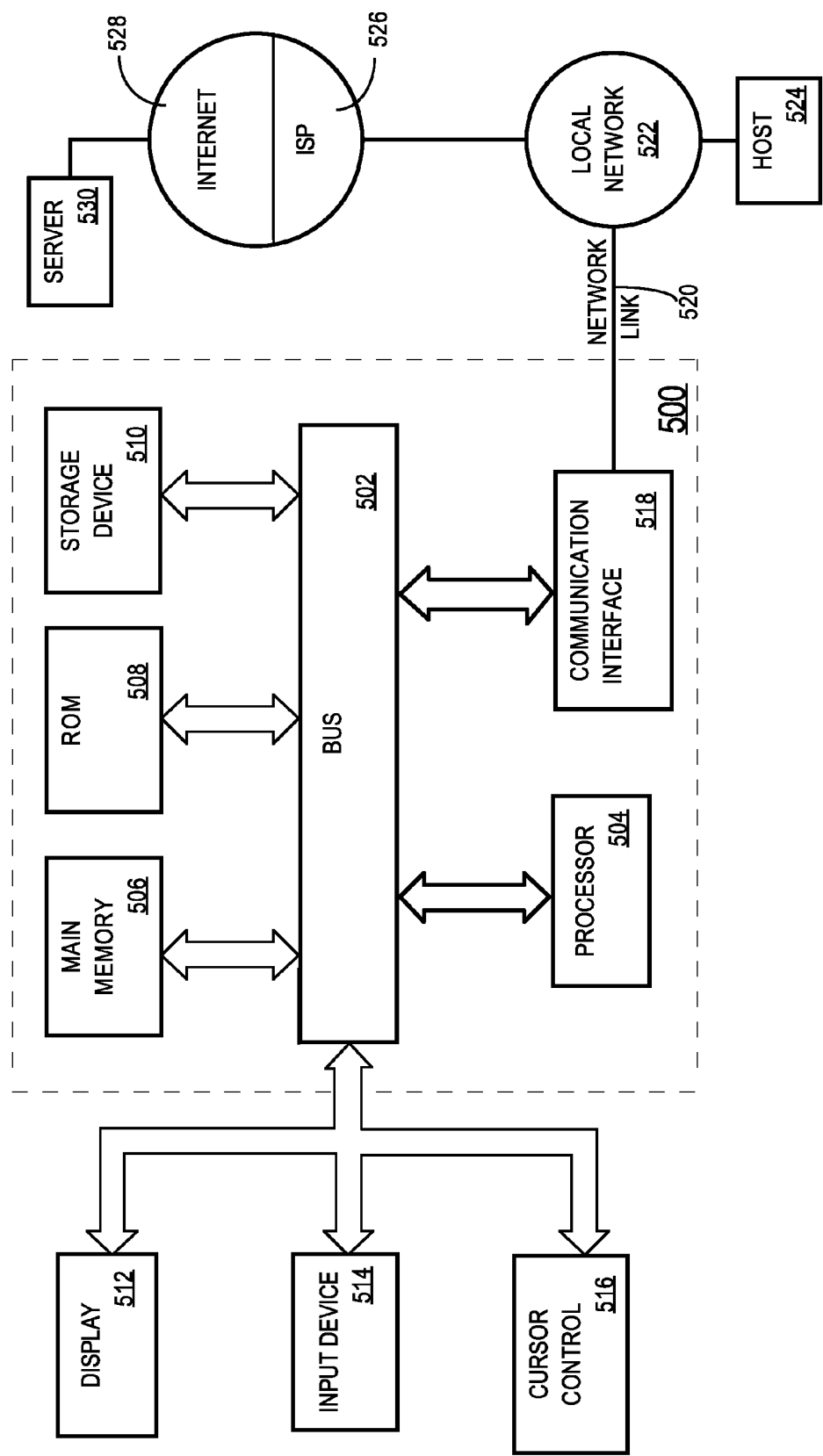
FIG. 5 is a diagram of an example computer system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an expression that specifies a value and a hierarchical path;
   using one or more indices that map values to nodes that contain the values within documents, determining that the specified value is stored in at least a particular node within a particular document;
   in response to determining that the specified value is stored in at least the particular node, discovering one or more names of one or more ancestor nodes of the particular node within the particular document by using a stored mapping the maps the particular node to the one or more ancestor nodes of the particular node;
   based at least in part on the one or more names of the one or more ancestor nodes of the particular node, determining that the particular node within the particular document is under the specified path; and
   generating a result set based at least in part on determining that the particular node is under the specified path;
   wherein the method is performed by one or more computing devices.

2. The method of claim 1, wherein the one or more indices map the values to hierarchical order keys that represent hierarchical positions of the nodes within the documents.

3. The method of claim 1, wherein the hierarchical path is an XPath, wherein the nodes are XML nodes within XML documents.

4. The method of claim 1, wherein the hierarchical path specified in the query is a part of a full hierarchical path of the particular node, wherein the full hierarchical path includes a particular name of the particular node and a list of names of nodes in which the particular node is nested.

5. The method of claim 1, wherein determining that the specified value is stored in the particular node within the particular document stored in the database is part of a value-based determination, and wherein determining that the particular node within the particular document is under the specified path is part of a path-based determination, further comprising:
   analyzing information based on a number of occurrences of the specified value in the database; and in response to analyzing the information, determining to perform the value-based determination before the path-based determination.

6. The method of claim 1, wherein determining that the specified value is stored in the particular node within the particular document stored in the database is part of a value-based determination, and wherein determining that the particular node within the particular document is under the specified path is part of a path-based determination, further comprising:
analyzing information based on a number of occurrences of the specified hierarchical path in the database; and
in response to analyzing the information, determining to perform the value-based determination before the path-based determination.

7. The method of claim 1, wherein determining that the specified value is stored in the particular node within the particular document stored in the database is part of a value-based determination, and wherein determining that the particular node within the particular document is under the specified path is part of a path-based determination, further comprising:
analyzing information based on both:
a first number of occurrences of the specified value in the database, and
a second number of occurrences of the specified hierarchical path in the database; and
in response to analyzing the information, determining to perform the value-based determination before the path-based determination.

8. The method of claim 7, wherein the analyzing comprises determining that the value-based determination is more selective than the path-based determination.

9. The method of claim 1, wherein the stored mapping from the particular node to the one or more ancestor nodes of the particular node comprises an entry in a node tree index of the particular document, and wherein the node tree index stores a location of the particular node within the particular document.

10. The method of claim 1, wherein the stored mapping from the particular node to the one or more ancestor nodes of the particular node comprises a mapping stored in a Document Object Model of the particular document.

11. One or more non-transitory storage media storing instructions which, when executed by one or more computing devices, cause performance of steps comprising:
receiving an expression that specifies a value and a hierarchical path;
using one or more indices that map values to nodes that contain the values within documents, determining that the specified value is stored in at least a particular node within a particular document;
in response to determining that the specified value is stored in the at least the particular node, discovering one or more names of one or more ancestor nodes of the particular node within the particular document by using a stored mapping that maps the particular node to the one or more ancestor nodes of the particular node;
based at least in part on the one or more names of the one or more ancestor nodes of the particular node, determining that the particular node within the particular document is under the specified path; and
generating a result set based at least in part on determining that the particular node is under the specified path.

12. One or more non-transitory storage media as recited in claim 11, wherein the one or more indices map the values to hierarchical order keys that represent hierarchical positions of the nodes within the documents.

13. One or more non-transitory storage media as recited in claim 11, wherein the hierarchical path is an XPath, wherein the nodes are XML nodes within XML documents.

14. One or more non-transitory storage media as recited in claim 11, wherein the hierarchical path specified in the query is a part of a full hierarchical path of the particular node, wherein the full hierarchical path includes a particular name of the particular node and a list of names of nodes in which the particular node is nested.

15. One or more non-transitory storage media as recited in claim 11, wherein determining that the specified value is stored in the particular node within the particular document stored in the database is part of a value-based determination, and wherein determining that the particular node within the particular document is under the specified path is part of a path-based determination, wherein the instructions, when executed by the one or more computing devices, further cause performance of:
analyzing information based on a number of occurrences of the specified value in the database; and
in response to analyzing the information, determining to perform the value-based determination before the path-based determination.

16. One or more non-transitory storage media as recited in claim 11, wherein determining that the specified value is stored in the particular node within the particular document stored in the database is part of a value-based determination, and wherein determining that the particular node within the particular document is under the specified path is part of a path-based determination, wherein the instructions, when executed by the one or more computing devices, further cause performance of:
analyzing information based on a number of occurrences of the specified hierarchical path in the database; and
in response to analyzing the information, determining to perform the value-based determination before the path-based determination.

17. One or more non-transitory storage media as recited in claim 11, wherein determining that the specified value is stored in the particular node within the particular document stored in the database is part of a value-based determination, and wherein determining that the particular node within the particular document is under the specified path is part of a path-based determination, wherein the instructions, when executed by the one or more computing devices, further cause performance of:
analyzing information based on both:
a first number of occurrences of the specified value in the database, and
a second number of occurrences of the specified hierarchical path in the database; and
in response to analyzing the information, determining to perform the value-based determination before the path-based determination.

18. One or more non-transitory storage media as recited in claim 17, wherein the analyzing comprises determining that the value-based determination is more selective than the path-based determination.

19. One or more non-transitory storage media as recited in claim 11, wherein the stored mapping from the particular node to the one or more ancestor nodes of the particular node comprises an entry in a node tree index of the particular document, and wherein the node tree index stores a location of the particular node within the particular document.

20. One or more non-transitory storage media as recited in claim 11, wherein the stored mapping from the particular node to the one or more ancestor nodes of the particular node comprises a mapping stored in a Document Object Model of the particular document.

\* \* \* \* \*

UNITED STATES PATENT AND TRADEMARK OFFICE
CERTIFICATE OF CORRECTION

| | | |
|---|---|---|
| PATENT NO. | : 8,566,343 B2 | Page 1 of 1 |
| APPLICATION NO. | : 12/871869 | |
| DATED | : October 22, 2013 | |
| INVENTOR(S) | : Baby et al. | |

It is certified that error appears in the above-identified patent and that said Letters Patent is hereby corrected as shown below:

In the Claims

Column 14, line 38, in Claim 1, delete "the" and insert -- that --, therefor.

Signed and Sealed this
Third Day of June, 2014

Michelle K. Lee
*Deputy Director of the United States Patent and Trademark Office*